United States Patent
Voss

(10) Patent No.: US 6,294,147 B1
(45) Date of Patent: Sep. 25, 2001

(54) TERNARY LITHIUM MANGANESE SPINEL AND PROCESS FOR THE PRODUCTION THEREOF

(75) Inventor: Heinz-Joachim Voss, Sulzbach (DE)

(73) Assignee: NBT GmbH (DE)

( * ) Notice: Subject to any disclaimer, the term of this patent is extended or adjusted under 35 U.S.C. 154(b) by 0 days.

(21) Appl. No.: 09/585,041

(22) Filed: Jun. 1, 2000

(30) Foreign Application Priority Data

Jul. 14, 1999 (DE) .............................................. 199 32 750

(51) Int. Cl.⁷ .............................. H01B 1/08; C01G 45/12; C04B 35/63
(52) U.S. Cl. ........................ 423/599; 252/518.1; 429/224
(58) Field of Search ........................ 423/599; 252/518.1; 429/224

(56) References Cited

U.S. PATENT DOCUMENTS 5,162,176 11/1992 Herr et al. .
5,879,654 * 3/1999 van Ghemen et al. .............. 423/593
6,183,718 * 2/2001 Barker et al. ........................ 423/599

FOREIGN PATENT DOCUMENTS

| 44 35 117 C1 | 5/1996 | (DE) . |
| 195 28 049 A1 | 2/1997 | (DE) . |
| 0 201 038 B2 | 1/1996 | (EP) . |

* cited by examiner

*Primary Examiner*—Mark Kopec
(74) *Attorney, Agent, or Firm*—Schnader Harrison Segal & Lewis LLP

(57) ABSTRACT

The invention relates to a process for the preparation of ternary lithium spinels, and to ternary lithium spinels of the general formula $Li_aMe_bMn_{2-b}O_c$.

The invention is achieved in accordance with the invention by a process which comprises dissolving a manganese salt in water, adding an oxidant, adding the mixture to an aqueous lithium hydroxide solution containing from 0.1 to 1 % by weight, based on the content of LiOH employed, of seed crystals selected from the group consisting of activated carbon, Aerosil and spine, and separating off, washing and heating the precipitate.

9 Claims, No Drawings

US 6,294,147 B1

TERNARY LITHIUM MANGANESE SPINEL AND PROCESS FOR THE PRODUCTION THEREOF

FIELD OF THE INVENTION

This invention relates to a process for the preparation of ternary lithium spinels, particularly to ternary lithium spinels of the general formula $Li_aMe_bMn_{2-b}O_c$.

BACKGROUND

Due to their high gravimetric and volumetric energy density, rechargeable lithium ion batteries are interesting for a multiplicity of battery-operated or -supported applications in portable electronic equipment, such as video cameras, laptop computers, mobile telephones and the like, but also for future motor vehicle equipment.

Elemental lithium as the positive electrode material, which is particularly interesting for the achievable energy density for gravimetric and volumetric reasons, is, as is known, associated with inadequate cycle stability of the cells and a considerable safety risk due to the formation of dendrites during charging and discharging.

As an alternative thereto, the system of the "lithium ion" battery, also known as the "rocking chair" battery, has been developed. That system uses electrode materials which can reversibly intercalate lithium both in the negative electrode and in the positive electrode. A carbon-containing material is usually employed as the positive electrode and a lithium-containing mixed oxide as the negative electrode material.

The active negative electrode materials currently preferred are lithium-containing layered oxides of cobalt or nickel, or mixed oxides of these metals. Although galvanic cells which have high energy densities and acceptable cycle stability can be produced using the known negative electrode materials, there continues to be a demand for less expensive and more toxicologically acceptable negative electrode materials. Furthermore, the system-inherent consumption of some of the lithium introduced with the negative electrode material for coating formation on the positive electrode material means that an unequal balance of the active materials is necessary, which can only be partly compensated by special measures, as described, for example, in EP-A 201 038, U.S. Pat. No. 5,162,176 or DE-A 195 28 049.

DE-A 44 35 117 and the specifications cited therein disclose ternary lithium manganese mixed oxides and processes for their preparation, which can be used as inexpensive, non-toxic alternatives to the cobalt and/or nickel compounds. These known mixed oxides are claimed to give cycle-stable electrode materials, but, due to their restricted lithium content, they do not allow adequate compensation for the loss of cyclable lithium. Furthermore, formation of the desired pure spinal crystal structure requires a phase conversion by high-temperature treatment.

Thus, the invention has as an object indicating a process for the preparation of ternary lithium-manganese spinels, and novel ternary lithium-manganese spinels obtainable by this process.

SUMMARY OF THE INVENTION

One aspect of the invention relates to a process for preparing ternary lithium-manganese spinels by precipitation from aqueous manganese salt solutions including dissolving a manganese salt in water, adding an oxidant to the water containing dissolved manganese salt to form a mixture, adding the mixture to an aqueous lithium hydroxide solution containing from about 0.1 to about 1% by weight, based on the content of LiOH, of seed crystals selected from the group consisting of activated carbon, silica and spinel, and separating off the resulting precipitate.

In another aspect, the invention relates to a ternary lithium-manganese spinel having the general formula $Li_aMe_bMn_{2-b}O_c$, in which Me is a metal from GROUP Iva or Va and wherein $1.0<a<1.8$, $0.005<b<0.25$ and $4.0\leq c<4.8$.

DETAILED DESCRIPTION OF THE INVENTION

It will be appreciated that the following description is intended to refer to specific embodiments of the invention selected for illustration in the following text and examples, and is not intended to define or limit the invention, other than in the appended claims.

The process according to the invention is distinguished by the fact that the desired pure spinel crystal structure is already obtained in the precipitated product and, consequently, high-temperature phase conversion is unnecessary. Furthermore, the choice of the seed crystal and the doping material allow the lithium content of the ternary lithium-manganese spinels obtainable in accordance with the invention to vary over a broad range.

For the preparation of the ternary lithium-manganese spinels by the process according to the invention, use is preferably made of water-soluble manganese salts, such as manganese sulfate, manganese chloride, manganese acetate, manganese nitrate, or a mixture of salts of this type.

Preference is given to an oxidant, such as hydrogen peroxide, sodium peroxide, sodium carbonate peroxohydrate, potassium peroxydisulfate or the like, in amounts of from about 1.5 to about 2.0 mol %, based on the amount of $Mn^{2+}$ ions employed.

The seed crystals employed are activated carbon, finely divided $SiO_2$ (Aerosil, i.e., silica, precipitated silica, pyrogenic silica or thermal silica, pyrogenic silicic acid) or spinels, in particular, lithium-manganese spinels, preferably those having a mean particle size of from about 0.01 to about 30 μm.

As a doping material, at least one metal cation selected from the group consisting of Co, V, Pb, Cr, Ti, Bi and Sn is particularly preferably added to the aqueous manganese salt solution in amounts of from about 2 to about 10 mol %, based on the amount of $Mn^{2+}$ ions employed.

In the process according to the invention, the dried precipitate of the lithium-manganese spinel obtained is preferably heated at from about 350 to about 600° C. for from about 1 to about 6 hours. Spinels obtainable by the process according to the invention have the general formula $Li_aMn_2O_c$.

Ternary lithium-manganese spinels according to the invention have the general formula $Li_aMe_bMn_{2-b}O_c$, in which Me is a metal from Group IVa or Va of the Periodic Table, and $1.0<a<1.8$, $0.005<b<0.25$ and $4.0\leq c<4.8$.

Especially preferred ternary lithium-manganese spinels are $Li_{1.37}Pb_{0.05}Mn_{1.95}O_c$, $Li_{1.35}Bi_{0.05}Mn_{1.95}O_c$ and $Li_{1.64}Sn_{0.17}Mn_{1.83}O_c$.

The process according to the invention is explained in greater detail below with reference to an example. Further experimental conditions and the compounds obtained thereby are shown in Table 1.

EXAMPLE 200 mg of activated carbon was added to a first solution consisting of 20 g of lithium hydroxide (LiOH), dissolved in 1200 ml of water and heated to 80° C. 1 ml of concentrated acetic acid and 50 ml of hydrogen peroxide (30% by weight) were added to a second solution consisting of 46.4 g of manganese acetate (MnAc in Table 1), dissolved in 400 ml of $H_2O$. The second solution was then added dropwise to the hot first solution.

A dark-brown precipitate was formed, which was filtered off using a white ribbon filter, washed briefly and dried at 80° C. in a drying cabinet.

The dried precipitate was heated at from 400 to 550° C. for one hour. The resultant product having the composition $Li_{1.14}Mn_2O_{4.4}$ exhibited the typical diffraction pattern of the spinel structure in the X-ray diffraction diagram. The sample obtained had an electrochemical capacity of about 90 mAh/g.

TABLE 1

| No. | Mn salt | Amt/g | LiOH/g | Seed Crystal | Amt/g | Salt | Amt/g | Li % | Mn tota/% | Mn IV % | Doping % | Stoichiometry |
|---|---|---|---|---|---|---|---|---|---|---|---|---|
| 1 | $MnSO_4*H_2O$ | 32 | 20 | Flame black | 0.2 | | | 2.49 | 55.3 | 45.2 | | $Li_{0.7}Mn_2O_{3.75}$ |
| 2 | $MnSO_4*H_2O$ | 32 | 20 | Graphite | 0.2 | | | 2.43 | 59.4 | | | |
| 3 | $MnSO_4*H_2O$ | 32 | 20 | Flame black | 2.0 | | | 2.16 | 57 | | | |
| 4 | $MnAc*4H_2O$ | 46.4 | 20 | Activ. carbon | 0.2 | | | 3.61 | 46.1 | 40.5 | | $Li_{1.24}Mn_2O_{4.38}$ |
| 5 | $MnAc*4H_2O$ | 46.4 | 20 | Aerosil | 0.2 | | | 2.88 | 51.5 | | | |
| 6 | $MnAc*4H_2O$ | 40.2 | 20 | Activ. carbon | 0.2 | CoAc | 4.2 | 3.85 | 53.3 | 49.2 | 6.52 | $Li_{1.03}Co_{0.21}Mn_{1.8}O_{4.17}$ |
| 7 | $MnAc*4H_2O$ | 40.2 | 20 | Activ. carbon | 0.2 | $NH_4VO_3$ | 2.3 | 0.82 | 48.2 | 43.4 | 5.04 | $Li_{0.12}V_{0.20}Mn_{1.80}O_x$ |
| 8 | $MnAc*4H_2O$ | 40.2 | 20 | Activ. carbon | 0.2 | $Na_2MoO_4$ | 2.52 | 3.24 | 43.2 | 44.4 | 0.47 | $Li_{1.18}Mo_{0.012}Mn_{1.99}O_x$ |
| 9 | $MnAc*4H_2O$ | 40.2 | 20 | Activ. carbon | 0.2 | $Ce_2(SO_4)_3$ | 2.54 | 3.12 | 41.9 | 40.6 | 4.47 | $Li_{1.13}Ce_{0.08}Mn_{1.92}O_x$ |
| 10 | $MnAc*4H_2O$ | 40.2 | 20 | Activ. carbon | 0.2 | PbAc | 1.83 | 3.62 | 40.9 | 50.2 | 4.18 | $Li_{1.37}Pb_{0.05}Mn_{1.95}O_x$ |
| 11 | $MnAc*4H_2O$ | 40.2 | 20 | Activ. carbon | 0.2 | $TiOSO_4$ | 3.34 | 4.39 | 53.4 | 44.2 | 4.02 | $Li_{1.19}Ti_{0.16}Mn_{1.84}O_x$ |
| 12 | $MnAc*4H_2O$ | 40.2 | 20 | Activ. carbon | 0.2 | $Bi(NO_3)_3$ | 2.32 | 4.57 | 52.5 | 46.7 | 4.88 | $Li_{1.35}Bi_{0.05}Mn_{1.95}O_x$ |
| 13 | $MnAc*4H_2O$ | 40.2 | 20 | Activ. carbon | 0.2 | Sn oxalate | 1.74 | 5.57 | 51.6 | 47.1 | 4.64 | $Li_{1.64}Sn_{0.17}Mn_{1.83}O_x$ |
| C1 | $MnSO_4*H_2O$ | 32 | 20 | Flame black | 0.2 | | | 0.08 | 67.3 | | | |

What is claimed is:

1. A process for preparing ternary lithium-manganese spinels by precipitation from aqueous manganese salt solution comprising:

dissolving a manganese salt in water;

adding an oxidant to the water containing dissolved manganese salt to form a mixture;

adding the mixture to an aqueous lithium hydroxide solution containing from about 0.1 to about 1% by weight, based on the content of LiOH, of seed crystals selected from the group consisting of activated carbon, silica and spinel; and separating off the resulting precipitate.

2. The process as claimed in claim 1, further comprising washing and drying the precipitate.

3. The process as claimed in claim 2, wherein the dried precipitate of the lithium-manganese spinel obtained is heated at from about 350 to about 600° C. for from about 1 to about 6 hours.

4. The process as claimed in claim 1, wherein the manganese salt is selected from the group consisting of manganese sulfate, manganese chloride, manganese acetate, manganese nitrate, and mixtures thereof.

5. The process as claimed in claim 1, wherein the oxidant is selected from the group consisting of hydrogen peroxide, sodium peroxide, sodium carbonate peroxohydrate and potassium peroxiydisulfate.

6. The process as claimed in claim 1, comprising about 1.5 to about 2.0 mol %, based on the amount of $Mn^{2+}$ ions of oxidant.

7. The process as claimed in claim 1, wherein seed crystals having a mean particle size of from about 0.1 to about 30 μm are employed.

8. The process as claimed in claim 1, wherein at least one metal cation selected from the group consisting of Co, V, Pb, Cr, Ti, Bi and Sn is added to the aqueous manganese salt solution.

9. The process as claimed in claim 8, comprising about 2 to about 10 mol %, based on the amount of $Mn^{2+}$ ions of said metal cation.

* * * * *